US009963382B2

(12) United States Patent
An et al.

(10) Patent No.: US 9,963,382 B2
(45) Date of Patent: May 8, 2018

(54) METHOD FOR HANDLING ULTRA-THIN GLASS FOR DISPLAY PANEL (71) Applicant: Corning Precision Materials Co., Ltd., Chungcheongnam-do (KR)

(72) Inventors: Jin Soo An, Chungcheongnam-do (KR); Bo Kyung Kong, Chungcheongnam-do (KR); Chang Moog Rim, Chungcheongnam-do (KR); Eun Heui Choi, Chungcheongnam-do (KR)

(73) Assignee: Corning Precision Materials Co., Ltd. (KR)

( * ) Notice: Subject to any disclaimer, the term of this patent is extended or adjusted under 35 U.S.C. 154(b) by 0 days. days.

(21) Appl. No.: 14/907,192

(22) PCT Filed: Jul. 28, 2014

(86) PCT No.: PCT/KR2014/006858
§ 371 (c)(1),
(2) Date: Jan. 22, 2016

(87) PCT Pub. No.: WO2015/012658
PCT Pub. Date: Jan. 29, 2015

(65) Prior Publication Data
US 2016/0159685 A1    Jun. 9, 2016

(30) Foreign Application Priority Data

Jul. 26, 2013  (KR) .................. 10-2013-0088785

(51) Int. Cl.
*B05D 5/12*         (2006.01)
*C03C 17/25*        (2006.01)
(Continued)

(52) U.S. Cl.
CPC .............. *C03C 17/25* (2013.01); *C03C 17/23* (2013.01); *C03C 23/007* (2013.01); *C03C 27/10* (2013.01);
(Continued)

(58) Field of Classification Search
CPC combination set(s) only.
See application file for complete search history.

(56) References Cited

U.S. PATENT DOCUMENTS 5,869,150 A      2/1999  Iwamoto
2004/0121516 A1*  6/2004  Yamazaki ............... C30B 13/24
                                                         438/106
(Continued)

FOREIGN PATENT DOCUMENTS

JP    08-086993 A    4/1996
JP    09-105896 A    4/1997
(Continued)

OTHER PUBLICATIONS

International Search Report for Application No. PCT/KR2014/006858 dated Nov. 20, 2014.

*Primary Examiner* — Austin Murata
(74) *Attorney, Agent, or Firm* — Lerner, David, Littenberg, Krumholz & Mentlik, LLP (57) ABSTRACT The present invention relates to a method for handling an ultra-thin glass for a display panel and, more specifically, the invention enables the ultra-thin glass to be easily attached to or detached from a carrier glass for supporting the ultra-thin glass before and after a surface treatment process for applying the ultra-thin glass to a display panel. To this end, the method for handling an ultra-thin glass for a display panel, according to the present invention, comprises: a bonding step for bonding an ultra-thin glass and a carrier glass for supporting the ultra-thin glass by means of a phase transition material; a surface treatment step for treating a surface of the (Continued)

ultra-thin glass; and a separation step for separating the ultra-thin glass from the carrier glass.

12 Claims, 5 Drawing Sheets

(51) Int. Cl.
- *C03C 17/23* (2006.01)
- *C03C 27/10* (2006.01)
- *C03C 23/00* (2006.01)
- *G02F 1/1333* (2006.01)
- *B65G 49/06* (2006.01)

(52) U.S. Cl.
CPC ...... *B65G 49/061* (2013.01); *C03C 2217/231* (2013.01); *C03C 2217/24* (2013.01); *G02F 2001/133302* (2013.01); *G02F 2001/133334* (2013.01)

(56) References Cited

U.S. PATENT DOCUMENTS

| | | | |
|---|---|---|---|
| 2009/0110882 A1 | 4/2009 | Higuchi | |
| 2011/0052836 A1* | 3/2011 | Kim | H01L 51/52 428/1.1 |
| 2012/0107979 A1 | 5/2012 | Moon et al. | |
| 2012/0280368 A1* | 11/2012 | Garner | B32B 17/10018 257/629 |
| 2014/0051192 A1* | 2/2014 | Lee | H01L 51/56 438/26 |

FOREIGN PATENT DOCUMENTS

| | | |
|---|---|---|
| JP | 2002020143 A | 1/2002 |
| KR | 100590724 B1 | 6/2006 |
| KR | 20090006824 A | 1/2009 |
| KR | 20090112824 A | 10/2009 |
| KR | 20120045529 A | 5/2012 |

\* cited by examiner

METHOD FOR HANDLING ULTRA-THIN GLASS FOR DISPLAY PANEL

CROSS REFERENCE TO RELATED APPLICATIONS

The present application is a national phase entry under 35 U.S.C. § 371 of International Application No. PCT/KR2014/006858, filed Jul. 28, 2014, which claims priority from Korean Application No. 10-2013-0088785, filed Jul. 26, 2013, all of which are incorporated herein by reference.

BACKGROUND OF THE INVENTION

Field of the Invention

The present invention relates to a method of handling an ultrathin glass for a display panel, and more particularly, to a method of handling a piece of ultrathin glass for a display panel which enables the piece of ultrathin glass to be easily attached to and detached from a piece of carrier glass which supports the piece of ultrathin glass before and after surface treatment which the piece of ultrathin glass needs for its application to the display panel.

Description of Related Art

At present, one of the biggest issues in the display industry is slimming. For this purpose, a fabrication process for a liquid crystal display (LCD) uses a piece of ultrathin glass having a thickness of 0.3 mm or less as a glass substrate in order to minimize the thickness of the LCD.

In order to fabricate such ultrathin glass, in the related art, a glass plate having a thickness of 0.5 mm or less is etched into an ultrathin glass plate having a thickness of 0.1 mm. However, since this method of the related art suffers from high cost, other improvements are required.

Recently, in response to the development in an ultrathin glass, methods capable of handling the ultrathin glass are studied. For instance, in the related art, a piece of ultrathin glass is attached to a piece of carrier glass, the ultrathin glass is subjected to surface treatment which the ultrathin glass needs for its application to a display panel, and then the surface-treated ultrathin glass is separated from the carrier glass. However, since the ultrathin glass is flexible, the ultrathin glass suffers from frequent problems, such as scratching, warping or fracture, during processing or separation from the carrier glass. That is, it is difficult to treat the ultrathin glass.

As such, handling ultrathin glass in the related art confronts significant difficulties, which lead to increases in defects and fabrication cost.

The information disclosed in the Background of the Invention section is provided only for better understanding of the background of the invention and should not be taken as an acknowledgment or any form of suggestion that this information forms a prior art that would already be known to a person skilled in the art.

RELATED ART DOCUMENT

Patent Document 1: Korean Patent No. 10-0590724 (Jun. 9, 2006)

BRIEF SUMMARY OF THE INVENTION

Various aspects of the present invention provide a method of handling a piece of ultrathin glass for a display panel which enables the piece of ultrathin glass to be easily attached to and detached from a piece of carrier glass which supports the piece of ultrathin glass before and after surface treatment which makes the piece of ultrathin glass able to be used for the display panel.

In an aspect of the present invention, provided is a method of handling a piece of ultrathin glass for a display panel. The method includes the following steps of: bonding a piece of ultrathin glass and a piece of carrier glass together via a phase transition material such that the piece of carrier glass supports the piece of ultrathin glass; surface-treating the piece of ultrathin glass; and separating the piece of ultrathin glass from the piece of carrier glass.

According to an embodiment of the invention, the phase transition material may be an electro-conductive material.

The phase transition material may be indium tin oxide to which a dopant is added.

The dopant may be one or a combination of at least two selected from the element group consisting of Ga, Zn, Ce, Mg, Zr and Nb.

The dopant added to the indium tin oxide may be $Ga_2O_3$, the content of the $Ga_2O_3$ ranging from 0.5 to 7% by weight.

The content of the $Ga_2O_3$ may be 2.9% by weight.

The thickness of the phase transition material disposed between the piece of ultrathin glass and the piece of carrier glass may be 100 nm or less.

The thickness of the phase transition material disposed between the piece of ultrathin glass and the piece of carrier glass may range from 30 to 50 nm.

The step of bonding the piece of ultrathin glass and the piece of carrier glass together may include coating a bonding surface of the piece of carrier glass with the phase transition material.

In this case, the piece of ultrathin glass may be separated from one surface of the phase transition material that has been bonded to the piece of ultrathin glass, the roughness of the one surface of the phase transition material is greater than the roughness of the other surface of the phase transition material that is bonded to the piece of carrier glass.

The step of bonding the piece of ultrathin glass and the piece of carrier glass together may include coating a bonding surface of the piece of ultrathin glass with the phase transition material.

The piece of carrier glass may be separated from one surface of the phase transition material that has been bonded to the piece of carrier glass, the roughness of the one surface of the phase transition material is greater than the roughness of the other surface of the phase transition material that is bonded to the piece of ultrathin glass.

The surface-treating the piece of ultrathin glass may be accompanied by heat treatment at a temperature equal to or above a phase transition temperature of the phase transition material.

The piece of ultrathin glass may be a piece of glass having a thickness of 0.3 mm or less.

According to embodiments of the present invention, when a piece of carrier glass is attached to a piece of ultrathin glass such that the piece of ultrathin glass can be handled during surface treatment thereon which makes the piece of ultrathin able to be used for a display panel, the piece of ultrathin glass and the piece of carrier glass are attached together via a phase transition material. It is therefore possible to achieve a superior adhesive force between the piece of ultrathin glass and the piece of carrier glass during the surface treatment. After the surface treatment, the piece of ultrathin glass can be easily separated from the piece of carrier glass, due to the crystallization of the phase transition material through heat treatment during the surface treatment.

In addition, since the piece of ultrathin glass can be easily separated from the piece of carrier glass, it is possible to prevent the piece of carrier glass from being damaged, whereby the piece of carrier glass can be reused for handling another piece of ultrathin glass, which leads to cost reduction.

Furthermore, the piece of ultrathin glass is coated with the electro-conductive phase transition material before being attached to the piece of carrier glass, whereby the piece of ultrathin glass separated from the piece of carrier glass can have an antistatic function.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Reference will now be made in detail to a method of handling an ultrathin glass for a display panel according to the present invention, embodiments of which are illustrated in the accompanying drawings and described below, so that a person skilled in the art to which the present invention relates can easily put the present invention into practice.

Throughout this document, reference should be made to the drawings, in which the same reference numerals and signs are used throughout the different drawings to designate the same or similar components. In the following description of the present invention, detailed descriptions of known functions and components incorporated herein will be omitted when they may make the subject matter of the present invention unclear.

Figure 1:
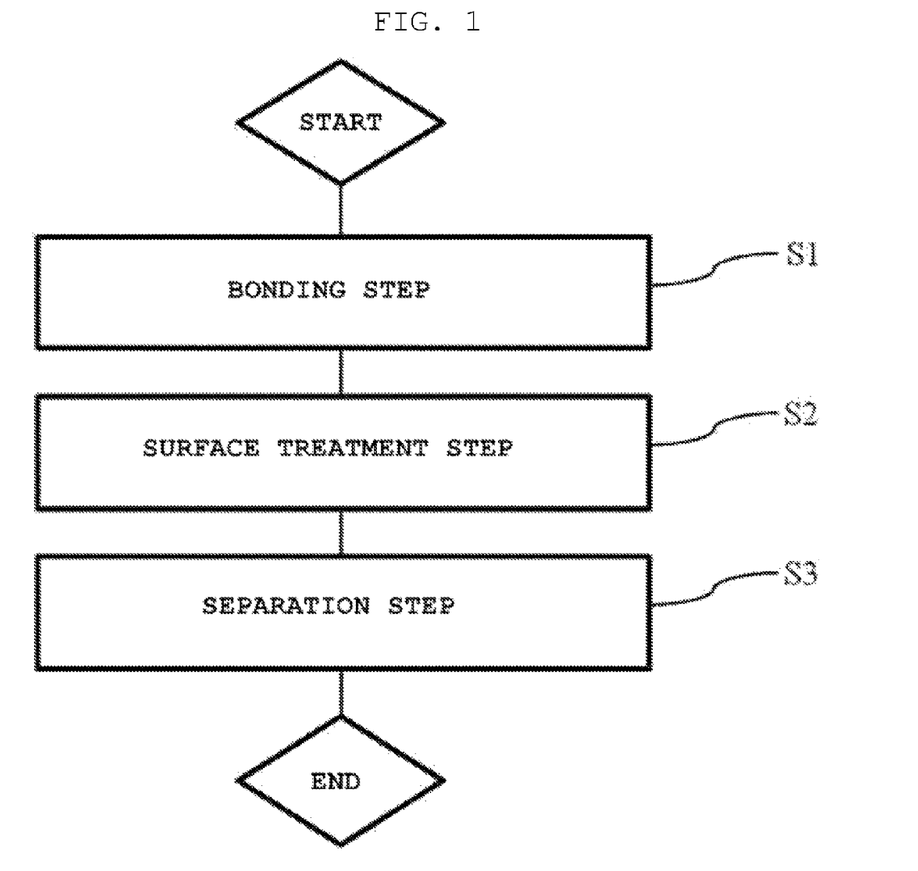
FIG. 1 is a flowchart sequentially showing processes of a method of handling an ultrathin glass for a display panel according to an exemplary embodiment of the present invention.

As shown in FIG. 1, a method of handling an ultrathin glass for a display panel according to an exemplary embodiment of the present invention is a handling method that can prevent the surface of a piece of ultrathin glass 110 from being scratched or the piece of ultrathin glass from being fractured while the piece of ultrathin glass is being subjected to surface treatment which makes the piece of ultrathin glass able to be used as either of upper and lower substrates which face each other in a display panel, for example, a liquid crystal display (LCD) panel. As shown in FIG. 1, the handling method includes a bonding step S1, a surface treatment step S2 and a separation step S3.

Figure 2:
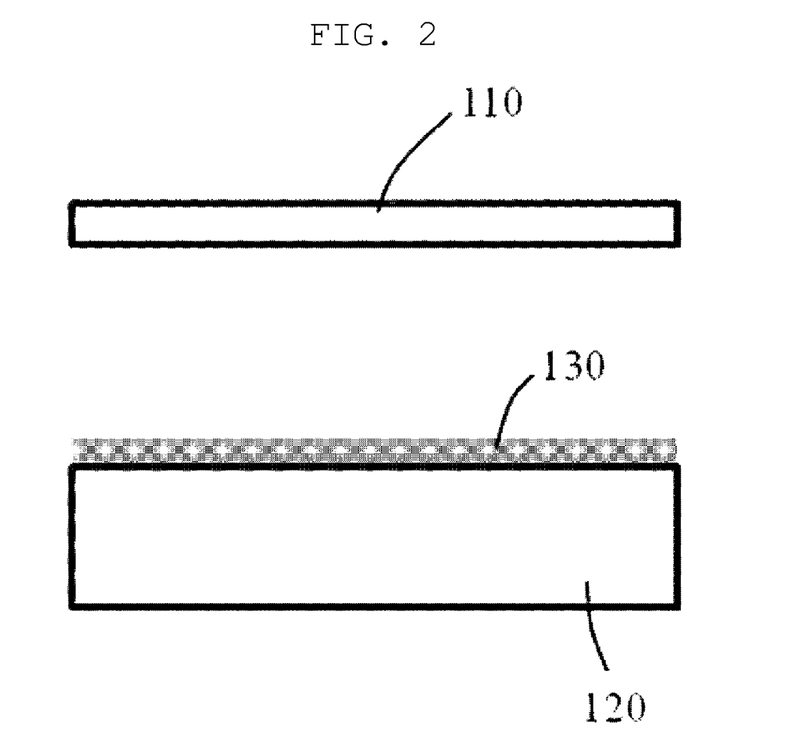
FIG. 2 to FIG. 5 are cross-sectional views sequentially showing the processes of the method of handling an ultrathin glass for a display panel according to the exemplary embodiment of the present invention.
Figure 3:
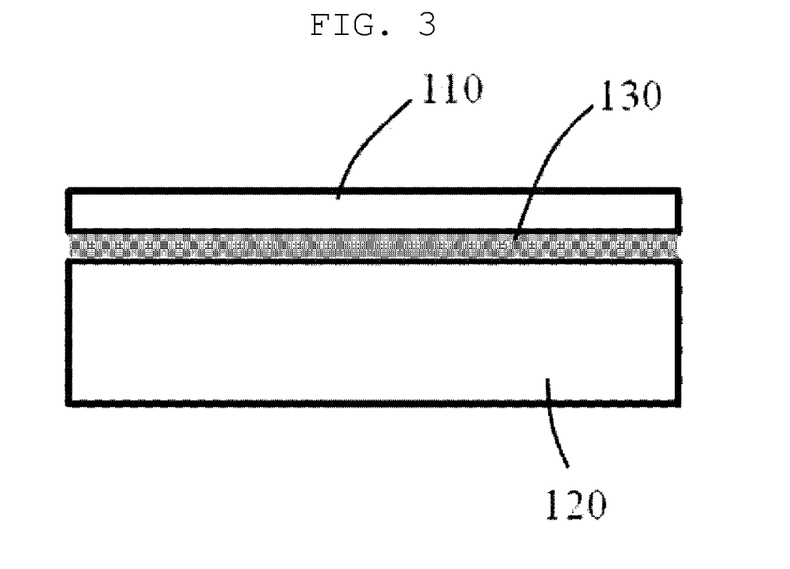

First, as shown in FIG. 2 and FIG. 3, the bonding step S1 is carried out by bonding the piece of ultrathin glass 110 and a piece of carrier glass 120 together. At the bonding step S1, the piece of ultrathin glass 110 available for a glass substrate of an LCD panel can be a piece of glass selected from among, but not limited to, silicate glass, silica glass, borosilicate glass and alkali-free glass, the thickness of which is 0.3 mm or less. The piece of carrier glass 120 can be the same type of glass as the piece of ultrathin glass 110. Since the piece of carrier glass 120 serves to support the piece of ultrathin glass 110 while the piece of ultrathin glass 110 is being subjected to surface treatment, the thickness of the piece of carrier glass 120 is preferably greater than the thickness of the piece of ultrathin glass 110.

At the bonding step S1 according this exemplary embodiment, the piece of ultrathin glass 110 and the piece of carrier glass 120 are bonded together via a phase transition material 130. According this exemplary embodiment, the phase transition material 130 can be an electro-conductive material. For instance, the phase transition material 130 can be indium tin oxide (ITO) to which a dopant is added. The dopant can be one or a combination of at least two selected from the element group consisting of, but not limited to, Ga, Zn, Ce, Mg, Zr and Nb. For instance, the phase transition material 130 can be ITO to which $Ga_2O_3$ is added. The content of $Ga_2O_3$ ranges from 0.5 to 7% by weight, and is preferably 2.9% by weight.

The phase transition material 130 tends to be readily attached to both of the piece of ultrathin glass 110 and the piece of carrier glass 120 since the phase transition material 130 stays amorphous at a temperature below its phase transition temperature even if its thickness is several tens of nanometers. In contrast, the phase transition material 130 becomes easily detachable when it is crystallized by heat treatment during the subsequent surface treatment step S2.

These characteristics of the phase transition material 130 can provide a superior adhesive force when the piece of ultrathin glass 110 is attached to the piece of carrier glass 120 which is intended to firmly support the piece of ultrathin glass 110 before the surface treatment step S2 that is the subsequent process to be conducted on the surface of the piece of ultrathin glass 110. It is therefore possible to prevent the piece of ultrathin glass 110 from being detached from the piece of carrier glass 120 or being damaged during the surface treatment step S2. It is also possible to easily detach the piece of ultrathin glass 110 from the piece of carrier glass 120 after the surface treatment step S2.

According to this exemplary embodiment, the phase transition material 130 can be formed between the piece of ultrathin glass 110 and the piece of carrier glass 120 such that its thickness is 100 nm or less, and preferably, ranges from 30 to 50 nm.

As shown in FIG. 2, according to this exemplary embodiment, before the piece of ultrathin glass 110 and the piece of carrier glass 120 are bonded together, the phase transition material 130 can be applied to coat one surface of the piece of carrier glass 120, i.e. the bonding surface of the piece of carrier glass 120 that is to be bonded to the piece of ultrathin glass 110. According to this exemplary embodiment, the phase transition material 130 can be formed on the bonding surface of the piece of carrier glass 120 by a coating method, such as sputtering, deposition, chemical vapor deposition (CVD) and a sol-gel method.

After that, as shown in FIG. 3, the bonding step S1 is carried out, whereby a multilayer structure in which the piece of ultrathin glass 110 and the piece of carrier glass 120 are attached together via the phase transition material 130 is produced. This multilayer structure exists as a temporary structure before the subsequent process of the surface treatment step S2 is completed.

Afterwards, the surface treatment step S2 is carried out by surface-treating the piece of ultrathin glass 110. The surface treatment step S2 is intended to improve the optical characteristics of the piece of ultrathin glass 110 since the piece of ultrathin glass 110 will be used for a glass substrate of, for example, an LCD panel. The surface treatment step S2 can include an etching process and a cleaning process. Since the bonding step S1 enables the piece of ultrathin glass 110 to be firmly supported on the piece of carrier glass 120 via the phase transition material 130, it is possible to prevent the piece of ultrathin glass 110 from being detached from the piece of carrier glass 120 during the surface treatment so that the piece of ultrathin glass 110 can be reliably surface-treated.

The surface treatment step S2 is accompanied by heat treatment at a temperature equal to or above the phase transition temperature of the phase transition material 130. When the surface treatment is carried out on the piece of ultrathin glass 110, a heat treatment temperature is typically 370° C. When the phase transition material 130 is Ga-doped ITO, the surface treatment step S2 causes a phase transition in which the phase transition material 130 crystallizes from the amorphous state, since the crystallization temperature of ITO ranges from 200 to 220° C.

TABLE 1

| Thickness of phase transition material | Adhesive force before heat treatment | Adhesive force after heat treatment |
| --- | --- | --- |
| 10 nm | 0.73 N | Damaged |
| 20 nm | 0.83 N | Damaged |
| 30 nm | 0.58 N | 1.25 N |

Table 1 above presents the results of adhesive force test depending on the thickness of the phase transition material 130, attributable to the heat treatment during the surface treatment on the piece of ultrathin glass 110. It was proved that, the thinner the phase transition material 130 was, the better the adhesive force before the heat treatment was. However, this tendency is maintained after the heat treatment. That is, when the thickness of the phase transition material 130 was 10 or 20 nm, the adhesive force after the heat treatment was increased to be 3 N or greater, whereby permanent bonding was achieved. This indicates that, after the heat treatment, the piece of ultrathin glass 110 and the piece of carrier glass 120 which are bonded together via the crystallized phase transition material 130 cannot be separated from each other. The word "Damaged" in Table 1 indicates the following situation: since the adhesive force of the phase transition material 130 was excessive, the piece of ultrathin glass 110 and the piece of carrier glass 120 were not separated from each other and instead, the structure including the piece of ultrathin glass 110 and the piece of carrier glass 120 was damaged when a separating force was continuously applied.

In contrast, when the thickness of the phase transition material 130 was 30 nm, the adhesive force after the heat treatment was measured to be 1.25 N, which is higher than before the heat treatment, but this indicates that the piece of ultrathin glass 110 and the piece of carrier glass 120 were separated from each other without being damaged.

Figure 4:
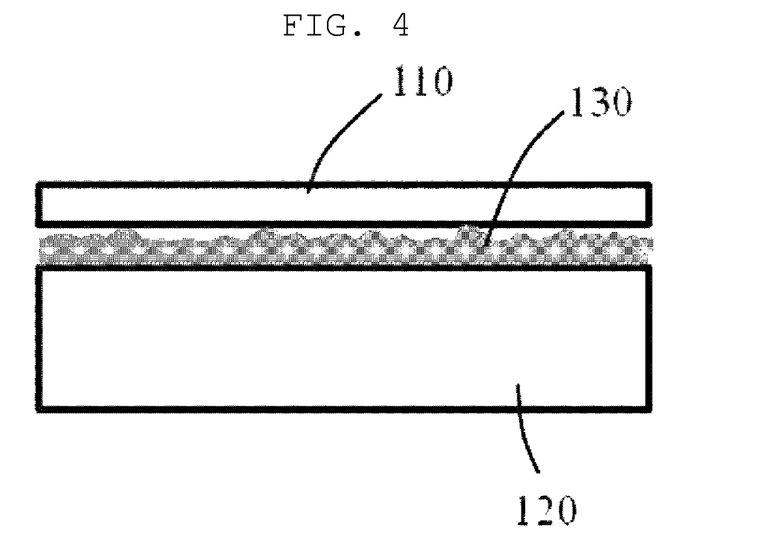

As shown in FIG. 4, the phase transition-induced crystallization of the phase transition material 130 that was initially amorphous causes an increase in the roughness of the surface of the phase transition material 130 bonded to the piece of ultrathin glass 110, i.e. the other surface of the phase transition material 130 that faces one surface of the phase transition material 130 bonded to the piece of carrier glass 120 during the coating. In other words, the crystallization of the phase transition material 130 causes no change in the surface state of the surface of the phase transition material 130 adjoining the surface of the piece of carrier glass 120 that is initially coated with the phase transition material 130, such that the superior adhesive force is continuously maintained. However, the crystallization increases the roughness of the surface of the phase transition material 130 adjoining the surface of the piece of ultrathin glass 110 that is attached to the phase transition material 130. The more highly rough surface of the phase transition material 130 which adjoins the piece of ultrathin glass 110 and the roughness of which was increased serves as a separation boundary at the subsequent separation step S3.

Figure 5:
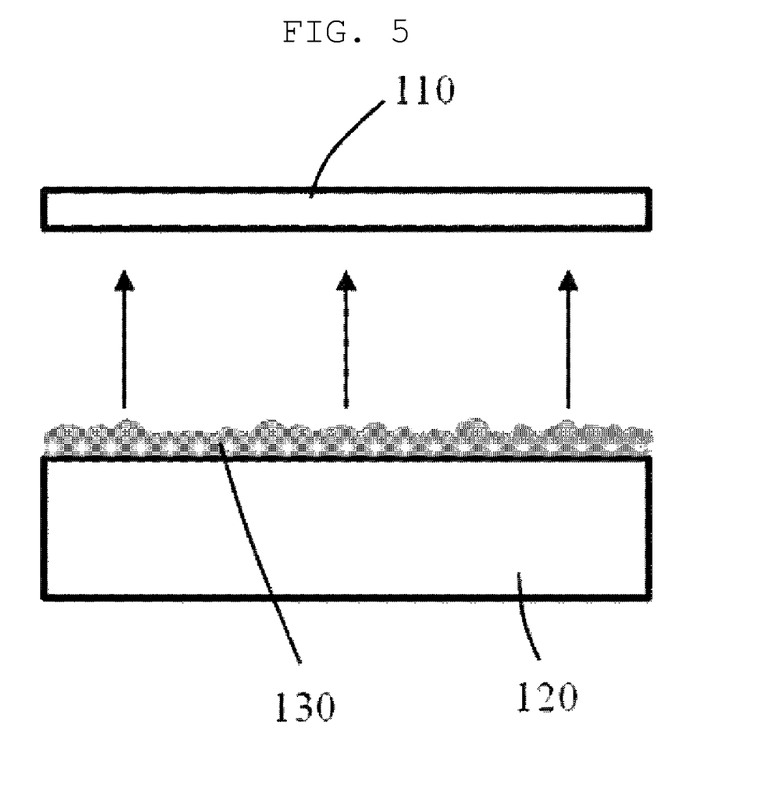

Finally, as shown in FIG. 5, the separation step S3 is carried out by separating the piece of ultrathin glass 110 from the piece of carrier glass 120. At the separation step S3, the piece of carrier glass 120 that has firmly supported the piece of ultrathin glass 110 during the surface treatment step S2 is separated from the piece of ultrathin glass 110, so that the piece of ultrathin glass 110, the optical characteristics of which are improved through the surface treatment, can be applied for a glass substrate of an LCD panel.

Specifically, the piece of ultrathin glass 110 is separated from the remaining structure at the separation step S3, in which the more highly rough surface of the phase transition material 130 serves as a separation boundary surface, the more highly rough surface of the phase transition material 130 being the surface adjoining the piece of ultrathin glass 110 among the both surfaces of the phase transition material 130 which has been crystallized through the heat treatment during the surface treatment step S2. The more highly rough surface of the phase transition material 130 serves as the separation boundary surface since its contact area with the glass is relatively reduced.

As such, when the piece of ultrathin glass 110 is easily separated from the piece of carrier glass 120 based on the characteristics of the phase transition material 130, it is possible to prevent the piece of carrier glass 120 from being damaged during the separation process. When the piece of carrier glass 120 is not damaged while the piece of ultrathin glass 110 is being separated therefrom, the piece of carrier glass 120 can be reused for handling another piece of ultrathin glass, which leads to cost reduction.

As described above, according to this exemplary embodiment, the piece of ultrathin glass 110 and the piece of carrier glass 120 are bonded together via the phase transition material 130, such that piece of ultrathin glass 110 can be reliably handled during the surface treatment on the piece of ultrathin glass 110 which makes the piece of ultrathin glass 110 able to be used as a glass substrate for a display panel.

Figure 6:
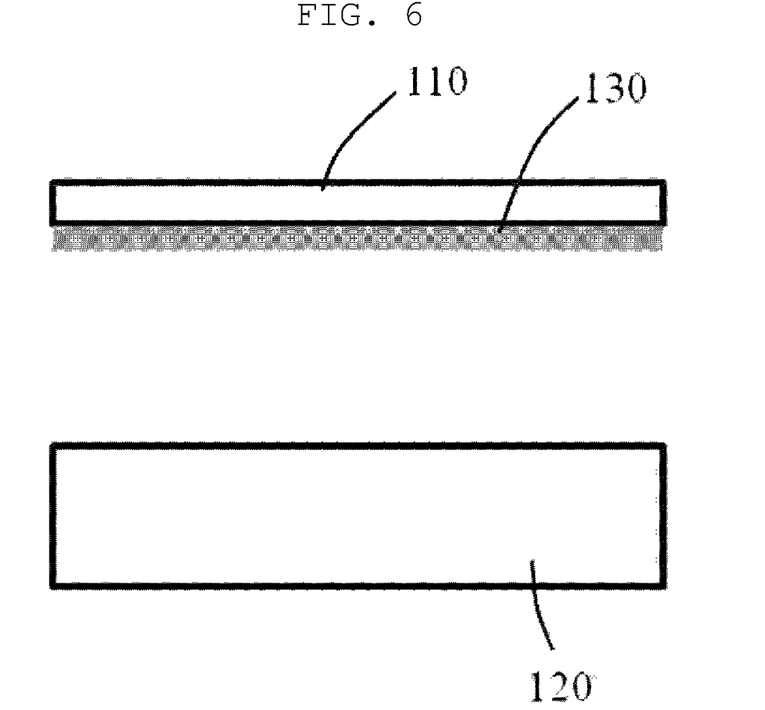
FIG. 6 to FIG. 9 are cross-sectional views sequentially showing processes of a method of handling an ultrathin glass for a display panel according to another exemplary embodiment of the present invention.

As shown in FIG. 6, according to this exemplary embodiment, before the piece of ultrathin glass 110 and the piece of carrier glass 120 are attached together, the bonding surface of the piece of ultrathin glass 110 that is to be attached to the piece of carrier glass 120 can be coated with the phase transition material 130. The phase transition material 130 can be applied by coating in the same fashion as in the former exemplary embodiment.

Figure 7:
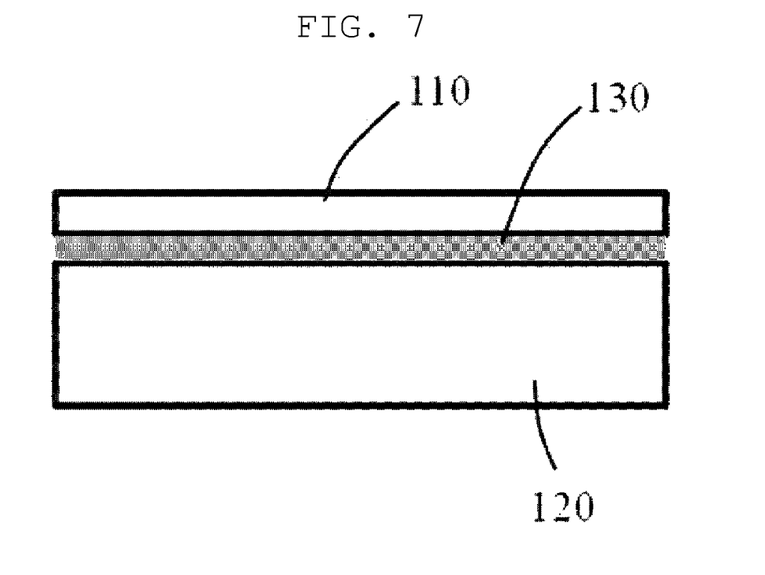

Afterwards, as shown in FIG. 7, the bonding step S1 is carried out, whereby a multilayer structure in which the piece of ultrathin glass 110 and the piece of carrier glass 120 are attached together via the phase transition material 130 is produced.

Figure 8:
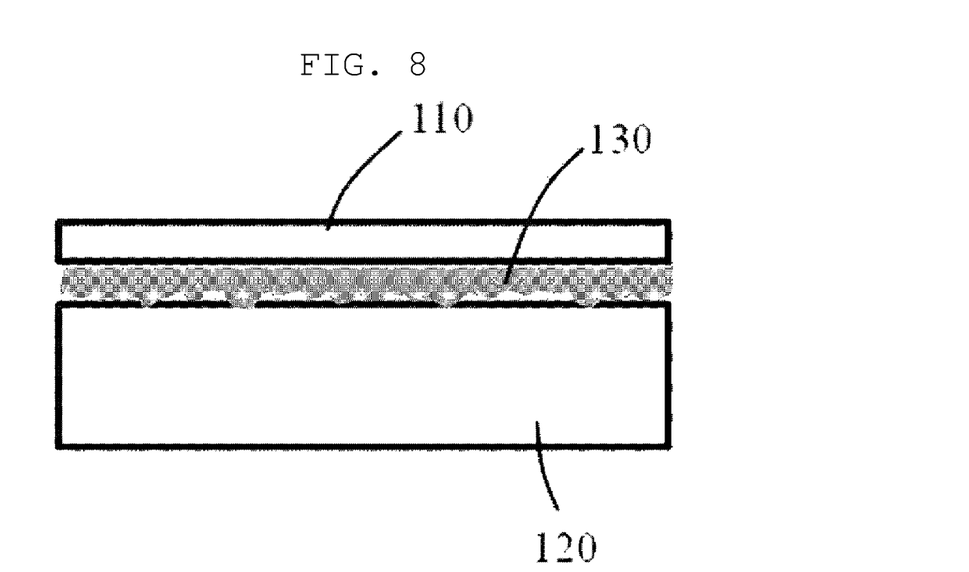

As shown in FIG. 8, when surface treatment step S2 is carried out in the state in which the surface of the piece of ultrathin glass 110 is coated with the phase transition material 130, the phase transition material 130 is crystallized through the heat treatment during the surface treatment step S2. Unlike in the former exemplary embodiment, this increases the roughness of the surface of the phase transition material 130 that adjoins the piece of carrier glass 120. The surface of phase transition material 130, the roughness of which is increased in this manner, serves as a separation boundary surface at the subsequent separation step S3.

Figure 9:
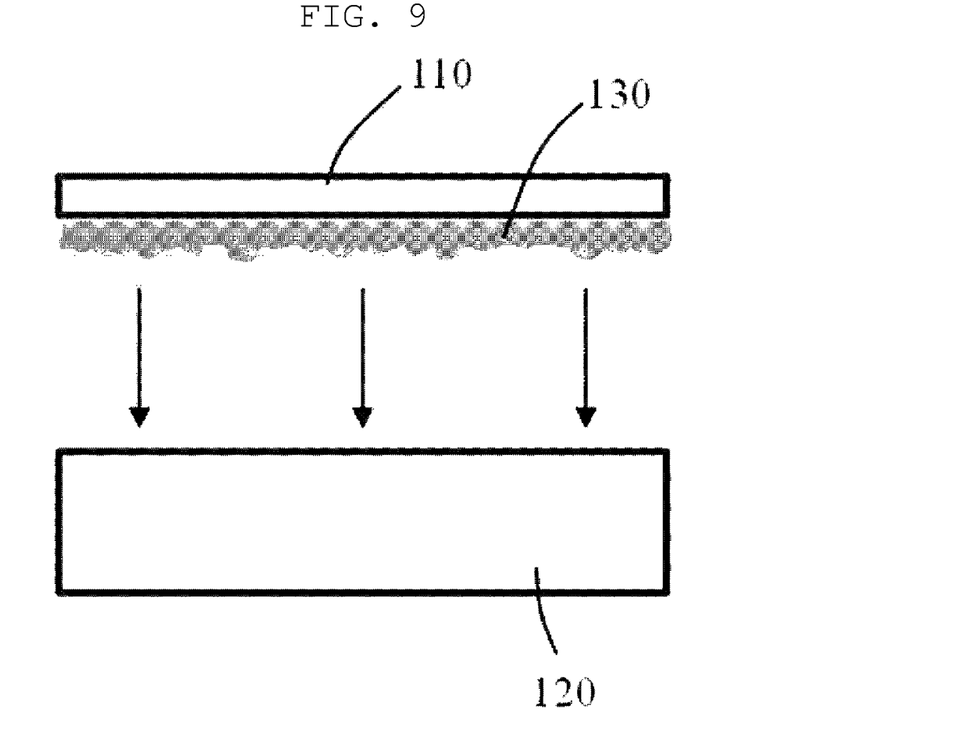

As shown in FIG. 9, the piece of carrier glass 120 is separated from the remaining structure at the separation step S3, in which the more highly rough surface of the phase transition material 130 serves as a separation boundary surface, the more highly rough surface of the phase transition material 130 being the surface adjoining the piece of carrier glass 120.

In this case, as shown in the figure, after the piece of carrier glass 120 is separated, the phase transition material 130 still remains as a thin film on the surface of the piece of ultrathin glass 110. Since the phase transition material 130 is electro-conductive, when the piece of ultrathin glass 110 having the thin film of the phase transition material 130 thereon is applied as a glass substrate for an LCD panel, the piece of ultrathin glass 110 can have an antistatic function.

The foregoing descriptions of specific exemplary embodiments of the present invention have been presented with respect to the drawings. They are not intended to be exhaustive or to limit the present invention to the precise forms disclosed, and obviously many modifications and variations are possible for a person having ordinary skill in the art in light of the above teachings.

It is intended therefore that the scope of the present invention not be limited to the foregoing embodiments, but be defined by the Claims appended hereto and their equivalents.

What is claimed is:

1. A method for handling a piece of ultrathin glass for a display panel, the method comprising:
   bonding a piece of ultrathin glass and a piece of carrier glass together via a phase transition material such that the piece of carrier glass supports the piece of ultrathin glass;
   surface-treating the piece of ultrathin glass; and
   separating the piece of ultrathin glass from the piece of carrier glass,
   wherein bonding the piece of ultrathin glass and the piece of carrier glass together comprises coating a bonding surface of the piece of ultrathin glass with the phase transition material,
   wherein the phase transition material is crystallized through the heat treatment during surface-treating the piece of ultrathin glass, thereby increasing the roughness of a surface of the phase transition material that adjoins the piece of carrier glass,
   wherein the surface of the phase transition material serves as a separation boundary surface at the subsequent separating the piece of ultrathin glass from the piece of carrier glass,
   wherein after the piece of carrier glass is separated, the phase transition material remains as a thin film on the bonding surface of the piece of ultrathin glass,
   wherein the phase transition material has electro-conductivity.

2. The method according to claim 1, wherein the phase transition material comprises indium tin oxide to which a dopant is added.

3. The method according to claim 2, wherein the dopant comprises one or a combination of at least two selected from the element group consisting of Ga, Zn, Ce, Mg, Zr and Nb.

4. The method according to claim 2, wherein the dopant added to the indium tin oxide comprises $Ga_2O_3$, a content of the $Ga_2O_3$ ranging from 0.5 to 7% by weight.

5. The method according to claim 4, wherein the content of the $Ga_2O_3$ is 2.9% by weight.

6. The method according to claim 1, wherein bonding the piece of ultrathin glass and the piece of carrier glass together comprises coating a bonding surface of the piece of carrier glass with the phase transition material.

7. The method according to claim 6, wherein, during the separating step, the piece of ultrathin glass is separated from one surface of the phase transition material that has been bonded to the piece of ultrathin glass, roughness of the one surface of the phase transition material is greater than roughness of the other surface of the phase transition material that is bonded to the piece of carrier glass.

8. The method according to claim 1, wherein, during the separating step, the piece of carrier glass is separated from one surface of the phase transition material that has been bonded to the piece of carrier glass, roughness of the one surface of the phase transition material is greater than roughness of the other surface of the phase transition material that is bonded to the piece of ultrathin glass.

9. The method according to claim 1, wherein surface-treating the piece of ultrathin glass comprises heat treatment at a temperature equal to or above a phase transition temperature of the phase transition material.

10. The method according to claim 1, wherein the piece of ultrathin glass has a thickness of 0.3 mm or less.

11. The method according to claim 1, wherein a thickness of the phase transition material disposed between the piece of ultrathin glass and the piece of carrier glass is 100 nm or less.

12. The method according to claim 11, wherein the thickness of the phase transition material disposed between the piece of ultrathin glass and the piece of carrier glass ranges from 30 to 50 nm.

* * * * *